United States Patent [19]

Inomata et al.

[11] 3,887,651

[45] June 3, 1975

[54] PROCESS FOR PREPARING COPOLYMER

[75] Inventors: Jihei Inomata, Tokyo; Masahiro Hayashi, Yokohama; Seiichi Nozawa, Tokyo; Takayuki Ota, Yokohama; Kazuo Endo, Yokohama; Yukio Yamaguchi, Yokohama, all of Japan

[73] Assignee: Mitsubishi Chemical Industries, Ltd., Japan

[22] Filed: Aug. 17, 1973

[21] Appl. No.: 389,132

[30] Foreign Application Priority Data

Aug. 17, 1972 Japan................................ 47-82272
Sept. 20, 1972 Japan................................ 47-94416

[52] U.S. Cl. .............. 260/879; 260/887; 260/80.73
[51] Int. Cl. ......................... C08f 15/40; C08d 9/08
[58] Field of Search.................. 260/879, 887, 80.73

[56] References Cited

UNITED STATES PATENTS

| 3,378,605 | 4/1968 | Baer.................................. 260/80.73 |
| 3,634,547 | 1/1972 | Rose et al........................... 260/879 |

Primary Examiner—Joseph L. Schofer
Assistant Examiner—Maria S. Tungol
Attorney, Agent, or Firm—Oblon, Fisher, Spivak, McClelland & Maier

[57] ABSTRACT

A copolymer which is useful for the fabrication of packaging materials is prepared by copolymerizing a mixture of an olefinic unsaturated nitrile, an alkylvinyl ether and an N-substituted acrylamide or N-substituted methacrylamide with a conjugated diene rubber.

14 Claims, No Drawings

PROCESS FOR PREPARING COPOLYMER

BACKGROUND OF THE INVENTION

1. Field of the Invention:

This invention relates to a process for preparing a copolymer. More particularly the invention relates to a process for preparing a copolymer having excellent moldability, transparency, gas impermeability and impact strength as well as having a high thermal deformation temperature such as a high heat resistance and a high creep resistance.

2. Description of the Prior Art:

Copolymers of acrylonitrile and various vinyl monomers have been used as resins for food and pharmaceutical containers and packages. One process has been proposed for the preparation of packaging materials in which acrylonitrile and an alkylvinyl ether are polymerized in the presence of a conjugated diene rubber. The copolymers prepared by this process have good moldability, gas impermeability, impact strength and transparency. However, the copolymers have inferior thermal deformation temperatures. Thus, containers molded with the conventional copolymers have inferior dimensional stability and are easily deformed when filled with food or pharmaceuticals which have been sterilized at high temperatures. The containers also have inferior resistance so that they are unsuitable for use as containers for carbonated drinks. However, there is a very large demand for containers which can hold carbonated drinks made from these materials.

A need, therefore, exists for a synthetic resin for use in packaging foods and pharmaceuticals which has a high creep resistance or dimensional stability.

SUMMARY OF THE INVENTION

Accordingly, one object of this invention is to provide a copolymer having excellent transparency, gas impermeability, impact strength and moldability as well as having a high thermal deformation temperature and a high creep resistance.

Another object of this invention is to provide a copolymer suitable for use as a container for carbonated drinks.

Briefly, these objects and other objects of the invention as hereinafter will become more readily apparent can be attained by providing a copolymer by a process which comprises copolymerizing 60 – 90% by weight of an olefinic unsaturated nitrile, 0.5 – 39.5% by weight of an alkylvinyl ether and 0.5 – 20% by weight of an N-substituted acrylamide having the formula

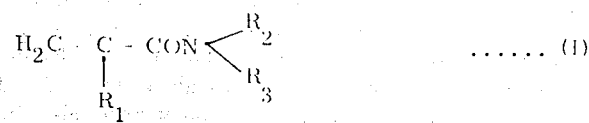

or

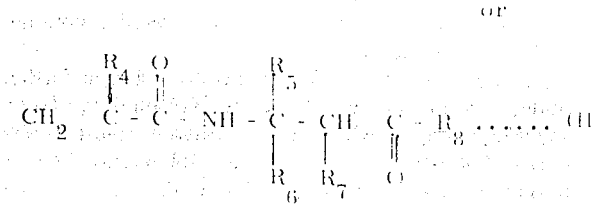

wherein $R_1$ represents hydrogen or methyl; $R_2$ and $R_3$ represent hydrogen or a $C_{1-8}$ alkyl group and at least one of $R_2$ and $R_3$ is an alkyl group; $R_4$ represents hydrogen or methyl and $R_5$, $R_6$, $R_7$ and $R_8$ represent hydrogen or a $C_{1-4}$ alkyl group with a rubber-like polymer comprising at least 50% by weight of a conjugated diene component, wherein the total weight of the mixture of said olefinic unsaturated nitrile, said vinyl ether and said N-substituted acrylamide is 3 – 50 times the weight of said rubber-like polymer.

DESCRIPTION OF THE PREFERRED EMBODIMENTS

The homopolymers of the conjugated diene used in the preparation of the invention include polymers prepared by polymerizing a conjugated diene such as 1,3-butadiene, isoprene, chloroprene, propylene, and the like. Preferably, a polymer of 1,3-butadiene or isoprene is used from the viewpoint of polymerizability and economics. Also within the scope of the invention are copolymers of the conjugated dienes and various vinyl comonomers. Suitable vinyl comonomers include olefinic unsaturated nitriles such as acrylonitrile and methacrylonitrile; olefinic unsaturated hydrocarbons such as styrene and α-methylstyrene; and olefinic unsaturated carboxylic esters such as methyl acrylate, ethyl acrylate, methyl methacrylate, ethyl methacrylate and the like. It is necessary that the copolymers formed contain at least 50% by weight of the conjugated diene component. If less than 50% by weight of the conjugated diene component is present, the rubberlike elasticity of the copolymer is inferior and the resulting polymer prepared by copolymerizing the prepared copolymer with an olefinic unsaturated nitrile, alkyl vinyl ether or N-substituted acrylamide having the formulas shown has a low impact strength.

The conjugated homopolymer or copolymer base can be prepared by any one of a number of well known processes such as bulk polymerization, solution polymerization, emulsion polymerization or suspension polymerization. The preferred method of preparation is an emulsion polymerization procedure so that a latex form of the polymer can be obtained. The emulsion polymerization procedure can be performed at 0°– 100°C in the presence of an emulsifier such as the alkali salt of rosin acid; a radical polymerization catalyst such as potassium persulfate; a redox type catalyst and a molecular weight regulator such as dodecylmercaptan. Incidentally, the homopolymer or copolymer of the conjugated diene used in the invention (hereinafter referred to as a conjugated diene copolymer) preferably has a gel content of more than 40% by weight, especially more than 60% by weight. In order to obtain a conjugated diene polymer having a high gel content, the polymerization temperature or polymerization time is usually controlled or a bifunctional monomer such as divinylbenzene, ethyleneglycol diacrylate or dimethacrylate is added. The gel content of the conjugated diene polymer is defined as the amount of the toluene insoluble portion of the conjugated diene polymer (percent by weight). Various methods for measuring the gel content has been proposed, and the following method is most commonly used. The conjugated diene polymer is dissolved in toluene containing 1 – 2 parts of an antioxidant such as trisnonylphenylphosphite based on 100 parts of the polymer. The polymer is coagulated in methanol and the coagulated product is washed with water and dried at 50°C for 20 hours under reduced pressure to prepare the sample. The sample is then immersed in toluene at 20°C for 20 hours to remove the soluble portion of the polymer and the remaining insoluble portion of the polymer is used to calculate the gel content on a weight percent basis of the insoluble portion relative to the original weight of the sample.

The important aspect of the invention is the copolymerization of an olefinic unsaturated nitrile, an alkylvinyl ether and an N-substituted acrylamide having the formulas shown earlier in the presence of the prepared conjugated diene rubber. Suitable olefinic unsaturated nitriles used in the copolymerization reaction include acrylonitrile, methacrylonitrile, and the like. Suitable alkylvinyl ethers include methylvinyl ether, ethylvinyl ether, N-propylvinyl ether, iso-propylvinyl ether, n-butylvinyl ether, iso-butylvinyl ether, tert-butylvinyl ether, and the like, which contain $C_{1-4}$ alkyl groups. Methylvinyl ether is the preferred alkyvinyl ether because the heat resistance properties of the finished product are the most substantial. The N-substituted acrylamides used in the invention as the third comonomer have formulas (I) or (II) and are as follows. Compounds with formula (I) include N-methyl acrylamide, N-ethylacrylamide, N-n-propylacrylamide, N-isopropyl acrylamide, N-n-butylacrylamide, N-isobutylacrylamide, N-tert-butylacrylamide, N-2-ethylhexylacrylamide, N,N'-dimethyl acrylamide, N,N'-diethylacrylamide, N-methylmethacrylamide, N-ethyl methacrylamide, N-n-propyl methacrylamide, N-isopropyl methacrylamide, N-n-butylmethacrylamide, N-isobutyl methacrylamide, N-tert-butyl methacrylamide, N-2-ethylhexyl methacrylamide, N,N'-dimethylmethacrylamide, N,N'-diethylmethacrylamide and the like. Compounds with formula (II) include N-(1,1-dimethyl-3-oxobutyl)acrylamide; (hereinafter referred to as diacetone acrylamide), N-(1-methyl-1-ethyl-2-methyl-3-oxobutyl)acrylamide, N-(1-methyl-1-ethyl-3-oxopentyl)acrylamide, N-(1,1-diethyl-2-methyl-3-oxopentyl)acrylamide, N-(1,1-dimethyl-3-oxobutyl)-methacrylamide, N-(1-methyl-1-ethyl-2-methyl-3-oxobutyl)methacrylamide, N-(1-methyl-1-ethyl-3-oxopentyl)methacrylamide, N-(1,1-diethyl-2-methyl-3-oxopentyl) methacrylamide, which are all diketone acrylamides, and are easily prepared by reacting a ketone with acrylonitrile. N-tert-butyl acrylamide, diacetone acrylamide and N-(1-methyl-1-ethyl-2-methyl-3-oxobutyl)acrylamide are the N-substituted acrylamides preferably and optimumly used.

In order to achieve an optimum balance of heat resistance, creep resistance, gas impermeability, moldability, transparency, and impact strength properties, it is necessary to use the following limits of the olefinic unsaturated nitrile, the alkylvinylether, and the N-substituted acrylamide, wherein 60 – 90% by weight of the olefinic unsaturated nitrile is combined with 0.5 – 39.5% by weight of the alkylvinyl ether and 0.5 – 20% by weight of the N-substituted acrylamide. When the copolymerization reaction is conducted with a monomer mixture wherein the amount of the components used are not maintained within the stated limits, the resulting copolymers have insufficient gas impermeability, moldability, or insufficient heat resistance and creep resistance. For example, if more than 20% by weight of the N-substituted acrylamide based on the total weight of the monomer mixture is used, it is difficult to obtain high molecular weight copolymers having high impact strength and moldability. On the other hand, if less than 0.5% by weight of the N-substituted acrylamide based on the total weight of the monomer mixture is used, it is difficult to obtain a copolymer having good heat resistance and creep resistance. If less than 60% by weight of the olefinic unsaturated nitrile is used, it is difficult to obtain a copolymer having good gas impermeability. If less than 0.5% by weight of the alkylvinyl ether is used or more than 90% by weight of the olefinic unsaturated nitrile is used, it is difficult to obtain a copolymer having good moldability.

The total monomer mixture of the olefinic unsaturated nitrile, the alkylvinyl ether and the N-substituted acrylamide is preferably used in quantities of 3 – 50 times, especially 5 – 20 times by weight of the conjugated diene polymer. If the amount of monomer mixture used is more than 50 times the amount of conjugated diene polymer, the impact strength of the resulting copolymer is too low. If the amount of monomer mixture used is less than 3 times the amount of diene polymer, the moldability and gas impermeability of the resulting copolymers are inferior.

The copolymerization of the olefinic unsaturated nitrile, the alkylvinyl ether and the N-substituted acrylamide, can be performed by conventional graft polymerization methods such as by bulk polymerization, suspension polymerization, emulsion polymerization, and solution polymerization. Preferably, an emulsion polymerization system is employed wherein the conjugated diene polymer used is in a latex condition. In the emulsion polymerization, the olefinic unsaturated nitrile, the alkylvinyl ether, the N-substituted acrylamide and the latex of the conjugated copolymer are mixed in a predetermined ratio, and an emulsifier such as sodium alkylbenzenesulfonate, potassium modified rosin acid salt, sodium alkylnaphthalene sulfonate, polyoxyethylene alkylphenolether sesquiphosphate, or the like, a water soluble catalyst such as potassium persulfate, and, if necessary, a redox catalyst and other conventional additives, are added and copolymerized at 0° – 100°C. After the copolymerization reaction is completed, an aqueous solution of an inorganic salt containing a small amount of aluminum sulfate is added to coagulate the copolymer, and the coagulated material is washed with water and dried to yield the copolymer.

The copolymers prepared by the invention have excellent moldability, transparency, gas impermeability, high impact strength, high thermal deformation temperature and high creep resistance because of the presence of the N-substituted acrylamide in the composition. Accordingly, containers such as bottle or films of the copolymers prepared by working the final composition by blow molding, extrusion molding, injection molding or the like techniques have excellent transparency, impact strength, gas impermeability, and are difficult to deform upon heating. Thus, the copolymers can be advantageously used as containers for food and pharmaceuticals or for packaging other materials. The copolymers also have excellent creep resistance so that the copolymers can be advantageously used as containers for carbonated drinks.

Having generally described this invention, a further understanding can be obtained by reference to certain specific examples which are provided herein for purposes of illustration only and are not intended to be limiting unless otherwise specified. In the examples and

EXAMPLE 1

A butadiene-acrylonitrile copolymer latex was copolymerized using the following components.

| | | |
|---|---|---|
| acrylonitrile | 9 | parts |
| 1,3-butadiene | 21 | parts |
| anionic surfactant emulsifier (Na-polyoxyethylene polyaromatic ether sesquiphosphate) 30% aq. solution | 1 | part |
| deionized water | 60 | parts |
| potassium persulfate | 0.03 | part |
| tert-dodecylmercaptan | 0.15 | part |

The stirred mixture of the components was copolymerized at 45°C for 15 hours and a uniform latex with a solid component content of 31% by weight was obtained. The conversion to product was 94% and the gel content of the polymer was 77% by weight and the acrylonitrile content was 30.0% by weight.

Acrylonitrile, methylvinyl ether and N-tert-butylacrylamide were copolymerized in the presence of the copolymer latex obtained.

| | | |
|---|---|---|
| acrylonitrile-butadiene copolymer latex (solid component 6 parts) | 19.1 | parts |
| deionized water | 180 | parts |
| anionic surfactant emulsifier (Na-polyoxyethylene alkylphenol sesquiphosphate) 30% aq. solution | 2 | parts |
| potassium persulfate | 0.036 | part |
| acrylonitrile | 48 | parts |
| methylvinyl ether | 9 | parts |
| N-tert-butylacrylamide | 3 | parts |
| n-dodecylmercaptan | 1.5 | parts |
| trisnonylphenyl phosphite | 0.15 | part |

A mixture of the copolymer latex and the unsaturated monomers was copolymerized at 45°C for 20 hours with stirring. The conversion to product was 87%. The reaction mixture was treated with an aqueous aluminum sulfate solution to coagulate the copolymer. The resulting copolymer was washed with water and dried at 60°C in a hot air circulation drier for 15 hours. Using a Koka flow tester, the extrusion rate of the copolymer from a nozzle having a diameter of 1 mm and a length of 2 mm at 190°C and 30 kg/cm$^2$ was $3.1 \times 10^{-3}$ cc/sec. The thermal deformation temperature whereby the copolymer is suddenly deformed was measured by heating the copolymer at a rate of 50°C/hour under a pressure of 20 kg/cm$^2$ using a plast meter equipped with parallel plates. The copolymer had a deformation temperature of 91.0°C. The polymer was heat-pressed to prepare a sheet having a thickness of 0.6 mm. The creep velocity and the creep elongation were measured with a creep tester (model CST-T manufactured by Toyo Sokuki K.K.) at 50°C under a weight of 200 kg/cm$^2$, and the copolymer had a creep velocity of 0.42%/hr after 300 – 900 minutes and a creep elongation of 11% after 900 minutes.

A film of the copolymer having a thickness of 0.04 mm was prepared and the permeability constant of $CO_2$ and $O_2$ through the film was measured with a dyssy type of gas permeating apparatus, and values of 0.31 ml - mm/m$^2$ - day at 760 mmHg; and 0.48 ml - mm/m$^2$ - day at 760 mmHg were obtained respectively.

REFERENCE 1

48 Parts of acrylonitrile and 12 parts of methylvinyl ether were copolymerized in the presence of 19.1 parts of the acrylonitrile-butadiene latex copolymer in accordance with the procedure of Example 1. The resulting copolymer had a thermal deformation temperature of 82.0°C, a creep velocity of 1.84%/hr and a creep elongation of 46.4%.

EXAMPLE 2

The copolymerization process of Example 1 was followed except that the amounts of acrylonitrile, tert-butyl acrylamide and methylvinylether used were changed. The results are shown in the following Table.

| Example No. | 2 - 1 | 2 - 2 | 2 - 3 | 2 - 4 |
|---|---|---|---|---|
| acrylonitrile (wt. part.) | 49.5 | 49.5 | 49.5 | 49.5 |
| t-butylacrylamide (wt.part.) | 1.5 | 3.0 | 4.5 | 6.0 |
| methylvinyl ether (wt. part.) | 9.0 | 7.5 | 6.0 | 4.5 |
| thermal deformation temperature (°C) | 88.8 | 93.8 | 98.3 | 104.0 |
| Izod impact strength (kg cm/cm$^2$) | 16.6 | 20.0 | 36.0 | 69.3 |
| creep velocity (percent/hr.) | — | 0.3 | — | 0.07 |
| creep elongation (%) | — | 12.0 | — | 5.0 |

EXAMPLE 3

48 Parts of acrylonitrile, 6 parts of methylvinylether and 6 parts of N-tert-butylacrylamide were copolymerized in the presence of 19.1 parts of an acrylonitrile-butadiene latex copolymer prepared in accordance with the procedure of Example 1 (solid component 6 parts). The resulting copolymer had an extrusion rate of $2.5 \times 10^{-3}$ cc/sec., a thermal deformation temperature of 95.5°C, a creep velocity of 0.1%/hr, and a creep elongation of 6.8%.

EXAMPLE 4

The copolymerization process of Example 1 was followed except that ethylvinyl ether was used instead of methylvinyl ether. The resulting copolymer had a flow velocity of $7.5 \times 10^{-3}$ cc/sec., a thermal deformation temperature of 88°C, a creep velocity of 0.5%/hr, a creep elongation of 27.2% and an Izod impact strength of 36 kg-cm/cm$^2$.

REFERENCE 2

The process of Reference 1 was followed except that ethylvinyl ether was used instead of methylvinyl ether. The resulting copolymer had a thermal deformation temperature of 78°C.

EXAMPLE 5

A methylacrylate-butadiene latex copolymer was prepared with the following components.

| | | |
|---|---|---|
| 1,3-butadiene | 21 | parts |
| methylacrylate | 9 | parts |
| deionized water | 60 | parts |
| anionic surfactant emulsifier (Na-polyoxyethylene polyaromatic ether sesquiphosphate) 30% aq. solution | 1 | part |
| potassium persulfate | 0.03 | part |
| tert-dodecylmercaptan | 0.15 | part |

The stirred mixture was copolymerized at 60°C for 25 hours and a latex having a solid component content of 25.0% was obtained. The gel content of the polymer was 76.6% by weight. Acrylonitrile, methylvinyl ether and N-tert-butylacrylamide were copolymerized in the presence of the copolymer latex in a polymerization medium containing the following components.

| | | |
|---|---|---|
| methylacrylate-butadiene copolymer latex (solid component 6 parts) | 24 | parts |
| deionized water | 180 | parts |
| anionic surfactant emulsifier (Na-polyoxyethylene alkylphenol sesquiphosphate) 30% aq. solution | 2 | parts |
| potassium persulfate | 0.036 | part |
| acrylonitrile | 49.5 | parts |
| methylvinyl ether | 4.5 | parts |
| N-tert-butylacrylamide | 6.0 | parts |
| N-dodecylmercaptan | 1.5 | parts |
| trisnonylphenylphosphite | 0.15 | part |

The stirred mixture was copolymerized at 60°C for 15 hours, and then treated in accordance with the procedure of Example 1 whereby a white powdery polymer was obtained. The resulting copolymer had an extrusion rate of $2.9 \times 10^{-3}$ cc/sec., a thermal deformation temperature of 99.5°C, a creep velocity of 0.08%/hr, a creep elongation of 5.2% and an Izod impact strength of 26 kg-cm/cm².

EXAMPLE 6

A styrene-butadiene latex copolymer was prepared with the following components.

| | | |
|---|---|---|
| 1,3-butadiene | 21 | parts |
| styrene | 9 | parts |
| deionized water | 60 | parts |
| anionic surfactant emulsifier (Na-polyoxyethylene polyaromatic ether sesquiphosphate) 30% aq. solution | 1 | part |
| potassium persulfate | 0.06 | part |
| tert-dodecylmercaptan | 0.15 | part |

The stirred mixture was copolymerized at 60°C for 20 hours and the copolymer obtained had a solid component content of 28.6%. Acrylonitrile, methylvinyl ether and tert-butylacrylamide were copolymerized in the presence of the copolymer latex, and the polymerization medium contained the following components.

| | | |
|---|---|---|
| styrene-butadiene copolymer latex (solid component 6 parts) | 21 | parts |
| deionized water | 120 | parts |
| anionic surfactant emulsifier (Na-polyoxyethylene polyaromatic ether sesquiphosphate) 30% aq. solution | 6 | parts |
| potassium persulfate | 0.036 | part |
| acrylonitrile | 51 | parts |
| methylvinyl ether | 6 | parts |
| N-tert-butylacrylamide | 3 | parts |
| N-dodecylmercaptan | 1.8 | parts |

The stirred mixture was copolymerized at 60°C for 15 hours. The resulting copolymer had a thermal deformation temperature of 92°C, a creep velocity of 0.09%/hr, a creep elongation of 5%, an Izod impact strength of 10.1 kg cm/cm² and an extrusion rate of $1.3 \times 10^{-3}$ cc/sec.

REFERENCE 3

In accordance with the procedure of Example 4, 51 parts of acrylonitrile and 9 parts of methylvinyl ether were copolymerized in the presence of 21 parts of the styrene-butadiene latex copolymer prepared in accordance with the procedure of Example 6. The resulting copolymer had an extrusion rate of $0.4 \times 10^{-3}$ cc/sec., a thermal deformation temperature of 85°C, a creep velocity of 0.24%/hr, a creep elongation of 11.2% and an Izod impact strength of 7.0 kg-cm/cm².

EXAMPLE 7

Acrylonitrile, methylvinyl ether and diacetoneacrylamide [N-(1,1-dimethyl-3-oxobutyl)acrylamide] were copolymerized in a polymerization medium containing the following components.

| | | |
|---|---|---|
| acrylonitrile-butadiene copolymer latex (solid component 7.5 parts) | 23.4 | parts |
| deionized water | 180 | parts |
| anionic surfactant emulsifier (Na-polyoxyethelene alkylphenol sesquiphosphate) 30% aq. solution | 2 | parts |
| potassium persulfate | 0.036 | part |
| acrylonitrile | 48 | parts |
| methylvinyl ether | 9 | parts |
| diacetoneacrylamide | 3 | parts |
| n-dodecylmercaptan | 1.5 | parts |
| trisnonylphenylphosphite | 0.15 | part |

The stirred mixture was copolymerized at 45°C for 20 hours and a conversion of 85% was obtained. The reaction mixture was treated with an aqueous aluminum sulfate solution, and the copolymer was coagulated. The resulting copolymer was washed with water and dried at 60°C in a hot air circulate drier for 15 hours. The resulting copolymer had an extrusion rate of $3.1 \times 10^{-3}$ cc/sec., a thermal deformation temperature of 85°C, an Izod impact strength (notch) of 78 kg cm/cm², a creep velocity of 1.04%/hr, a creep elongation of 26.8%, a $CO_2$ permeation constant of 0.3 ml-mm/m² day at 760 mmHg and an $O_2$ permeation constant of 0.4 ml-mm/m² day at 760 mmHg.

EXAMPLE 8

48 Parts of acrylonitrile, 6 parts of methylvinyl ether and 6 parts of diacetoneacrylamide were copolymerized in the presence of the butadieneacrylonitrile latex compolymer prepared in accordance with the procedure of Example 1. The resulting copolymer had an extrusion rate of $2.5 \times 10^{-3}$ cc/sec, a thermal deformation temperature of 90°C, a creep velocity of 0.30%/hr, a creep elongation of 11.6%, and an Izod impact strength (notch) of 90.8 kg cm/cm².

EXAMPLE 9

48 Parts of acrylonitrile, 3 parts of methylvinyl ether and 9 parts of diacetone acrylamide were copolymerized in the presence of the butadiene-acrylonitrile latex copolymer prepared in accordance with the procedure of Example 1. The resulting copolymer had an extrusion rate of $1.3 \times 10^{-3}$ cc/sec, a thermal deformation temperature of 93°C, a creep velocity of 0.12%/hr and a creep elongation of 6.6%.

EXAMPLE 10

Acrylonitrile, methylvinyl ether and diacetoneacrylamide were copolymerized in the presence of the methylacrylate-butadiene copolymer of Example 5 in a polymerization medium containing the following components.

| | | |
|---|---|---|
| methylacrylate-butadiene copolymer latex (solid 6 parts) | 24 | parts |
| deionized water | 180 | parts |
| anionic surfactant emulsifier (Na-polyoxyethylene alkylphenol sesquiphosphate) 30% aq. solution | 2 | parts |
| potassium persulfate | 0.036 | part |
| acrylonitrile | 48 | parts |
| methylvinyl ether | 6 | parts |
| diacetone acrylamide | 6 | parts |
| n-dodecylmercaptan | 1.5 | parts |
| trisnonylphenylphosphite | 0.15 | part |

The stirred mixture was copolymerized at 60°C for 15 hours and then treated in accordance with the procedure of Example 1 whereby a white powdery copolymer was obtained. The copolymer had an extrusion rate of $2.8 \times 10^{-3}$ cc/sec., a thermal deformation temperature of 90°C, a creep velocity of 0.20%/hr., a creep elongation of 14%, and an Izod impact strength of 35 kg cm/cm².

EXAMPLE 11

Acrylonitrile, methylvinyl ether and diacetoneacrylamide were copolymerized in the presence of the styrene-butadiene latex copolymer of Example 6 in a polymerization medium containing the following components.

| | | |
|---|---|---|
| styrene-butadiene copolymer latex (solid 6 parts) | 20.6 | parts |
| deionized water | 120 | parts |
| anionic surfactant emulsifier (Na-polyethylene polyaromatic ether sesquiphosphate) 30% aq. solution | 6 | parts |
| potassium persulfate | 0.036 | part |
| acrylonitrile | 48 | parts |
| methylvinyl ether | 6 | parts |
| diacetoneacrylamide | 6 | parts |
| n-dodecylmercaptan | 1.8 | parts |

The stirred mixture was copolymerized at 60°C for 15 hours. The resulting polymer had an extrusion rate of $1.0 \times 10^{-3}$ cc/sec., a thermal deformation temperature of 90°C, a creep velocity of 0.25%/hr, a creep elongtion of 10% and an Izod impact strength of 26 kg-cm/cm².

EXAMPLE 12

The process of the copolymerization of Example 1 was followed except that N-(1-methyl-1-ethyl-2-methyl-3-oxobutyl)acrylamide was used instead of diacetoneacrylamide. The resulting copolymer had a high thermal deformation temperature.

EXAMPLE 14

Acrylonitrile, methacrylonitrile, methylvinyl ether and N-tert-butylamide were copolymerized in the presence of a polybutadiene latex having a total solids content of 23.7% by weight and a toluene insoluble component of 48% by weight in a polymerization medium containing the following components.

| | | |
|---|---|---|
| polybutadiene latex (solid component 6.4 parts) | 27 | parts |
| deionized water | 120 | parts |
| Na-polyoxyethylene polyaromatic ether sesquiphosphate | 6 | parts |
| potassium persulfate | 0.036 | part |
| acrylonitrile | 24 | parts |
| methacrylonitrile | 24 | parts |
| methylvinyl ether | 6 | parts |
| tert-butylacrylamide | 6 | parts |
| N-dodecylmercaptan | 1.8 | parts |

The stirred mixture was copolymerized at 60°C for 15 hours at a conversion rate of 85%. The resulting product was treated in accordance with the procedure of Example 1 and a white powdery polymer was obtained. The resulting copolymer had an extrusion rate of $1.3 \times 10^{-3}$ cc/sec., a thermal deformation temperature of 102°C, an Izod impact strength of 25.1 kg/cm², a creep velocity of 0.07%/hr and a creep elongation of 5%.

REFERENCE 4

A copolymerization reaction was conducted in accordance with the procedure of Example 14 except that 12 parts of methylvinyl ether were used and no tert-butyl acrylamide was used. The resulting copolymer had an extrusion rate of $2.0 \times 10^{-3}$ cc/sec., a thermal deformation temperature of 88°C, an Izod impact strength of 15 kg/cm², a creep velocity of 0.3%/hr, and a creep elongation of 15%.

Having now fully described the invention, it will be apparent to one of ordinary skill in the art that many changes and modifications can be made thereto without departing from the spirit or scope of the invention as set forth herein.

What is claimed as new and intended to be covered in Letters Patent is:

1. A graft copolymer prepared by a process, which comprises:

copolymerizing 60 – 90% by weight of acrylonitrile, of methacrylonitrile or mixtures thereof, 0.5 – 39.5% by weight of an alkylvinyl ether containing $C_{1-4}$ alkyl groups and 0.5 – 20% by weight of an N-substituted acrylamide having a formula of

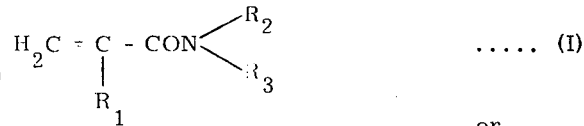

$$\ldots\ldots (I)$$

or

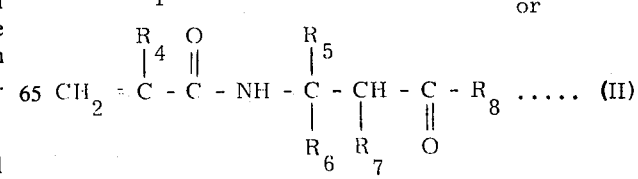

$$\ldots\ldots (II)$$

wherein
R$_1$ represents hydrogen or methyl; R$_2$ and R$_3$ represent hydrogen or a C$_{1-8}$ alkyl group and at least one of R$_2$ and R$_3$ is an alkyl; R$_4$ represents hydrogen or methyl and R$_5$, R$_6$, R$_7$ and R$_8$ represent hydrogen or C$_{1-4}$ alkyl groups, with a homopolymer of a conjugated diene or a copolymer containing at least 50 weight % of said conjugated diene and a vinyl monomer, wherein the total weight of the mixture of said nitrile, said vinyl ether and said N-substituted acrylamide is 3 – 50 times the weight of said homopolymer or copolymer, at 0°– 100°C.

2. The copolymer of claim 1, wherein said N-substituted acrylamide is a compound of formula (I).

3. The copolymer of claim 1, wherein said N-substituted acrylamide is diacetoneacrylamide.

4. The copolymer of claim 1, wherein said N-substituted acrylamide is N-tert-butylacrylamide.

5. The copolymer of claim 1, wherein said N-substituted acrylamide is N-(1-methyl-1-ethyl-2-methyl-3oxobutyl)acrylamide.

6. The copolymer of claim 1, wherein said nitrile is acrylonitrile or methacrylonitrile.

7. The copolymer of claim 2, wherein said alkylvinyl ether is methylvinyl ether or ethylvinyl ether.

8. The copolymer of claim 1, wherein said N-substituted acrylamide is a compound of formula (II).

9. The copolymer of claim 1, wherein said homopolymer or copolymer is a homopolymer of 1,3-butadiene, a copolymer of 1,3-butadiene and acrylonitrile, a copolymer of 1,3-butadiene and styrene or a copolymer of 1,3-butadiene and methylacrylate.

10. The copolymer of claim 1, wherein said homopolymer or copolymer contains at least 40% by weight of a gel component.

11. The copolymer of claim 1, wherein the copolymerization of said nitrile, said alkylvinyl ether and said N-substituted acrylamide is conducted in an emulsion medium.

12. The copolymer of claim 1, wherein said nitrile is acrylonitrile, said alkylvinyl ether is methylvinyl ether and said N-substituted acrylamide is N-tert-butylacrylamide.

13. The copolymer of claim 12, wherein said N-substituted acrylamide is diacetoneacrylamide.

14. A process for preparing a graft copolymer which comprises copolymerizing 60 – 90% by weight of acrylonitrile, methacrylonitrile, or mixtures thereof, 0.5 – 39.5% by weight of an alkylvinyl ether containing C$_{1-4}$ alkyl groups and 0.5 – 20% by weight of an N-substituted acrylamide having a formula of

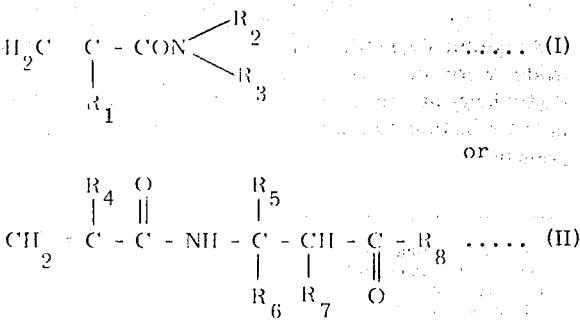

wherein R$_1$ represents hydrogen or methyl; R$_2$ and R$_3$ represent hydrogen or a C$_{1-8}$ alkyl group and at least one of R$_2$ and R$_3$ is an alkyl; R$_4$ represents hydrogen or methyl and R$_5$, R$_6$, R$_7$, and R$_8$ represent hydrogen or C$_{1-4}$ alkyl groups, with a homopolymer of a conjugated diene or a copolymer containing at least 50 weight percent of said conjugated diene and a vinyl comonomer, wherein the total weight of the mixture of said nitrile, said vinyl ether and said N-substituted acrylamide is 3 – 50 times the weight of said homopolymer or copolymer, at 0° – 100°C.

* * * * *